Feb. 16, 1937.    H. ESCHENBRENNER    2,070,888
LINED CONCRETE PIPE
Filed June 24, 1935

Hector Eschenbrenner,
INVENTOR.
BY Paul Purchard,
ATTORNEY

Patented Feb. 16, 1937

2,070,888

UNITED STATES PATENT OFFICE 2,070,888

LINED CONCRETE PIPE

Hector Eschenbrenner, Columbus, Ohio

Application June 24, 1935, Serial No. 28,115

2 Claims. (Cl. 138—80)

This invention relates to conduits for sewerage, drainage, or other similar purposes, and more in particular to pre-cast concrete conduits the interior surface of which is provided with a corrosion and abrasion resisting lining of a different material.

One of the principal objects of this invention is to provide a pre-cast conduit of concrete, either plain or reinforced, having a one-piece interior lining made, preferably, of vitrified clay, the length of said lining being equal to that of the effective length of the concrete conduit.

Another object of this invention is to provide a composite conduit in which the lining may cover the full interior surface of the outer concrete member, or but a fraction thereof.

Still another object is to provide a conduit in which the outer concrete member and the inner lining are securely bound together, either by the natural adhesion between the component members or by means of additional mechanical provisions, preferably placed on the inner lining.

Yet another object of this invention is the provision of a composite conduit in which the inner lining is fully protected against injury in handling and is not subject to any loads superposed upon the conduit, said loads being entirely taken care of by the outer member of concrete, which may be either plain or reinforced, as conditions may require.

Additional features and advantages of this invention will appear in the following description considered in connection with the accompanying drawing forming a part of this application.

In the drawing:

Fig. 1 is a longitudinal section through a composite conduit, of the tongue and groove type, provided with a full inner lining of vitrified clay, or the like.

Fig. 4 shows a longitudinal section through a conduit of the "bell and spigot" type also provided with a full inner lining of vitrified clay, or the like.

Figure 1:
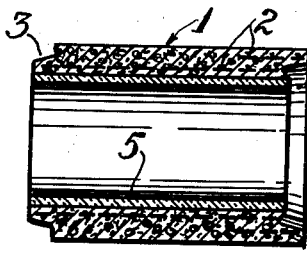

The usual modern engineering practice is to construct sewerage or drainage systems with factory made pipe sections which are joined, end to end, to suit the required length of the system under consideration.

The materials now preferably used may be either corrugated steel pipes, vitrified clay pipes or pre-cast concrete pipes, either plain or reinforced.

The principal objection to the use of corrugated steel piping is based on the fact that this piping does not resist for a long time the corrosive action of various chemicals which may be present in the fluid drained. Furthermore, if sand or other abrasive matter is carried along by the fluid, the combined actions of corrosion and scouring will further shorten the usefulness of this type of conduit.

This destructive process occurs principally at the bottom of the conduit, and more in particular at the more exposed crests of the corrugations.

Attempts have been made to overcome these deficiencies of the corrugated pipes by applying thereto one or more coats of protective material, such as bituminous or asphaltic compounds; but practical experience has shown that such protective coats do not produce entirely satisfactory results, their value being, at best, only of a temporary character.

A further disadvantage of this type of conduit is that it offers rather considerable resistance to the flow of the drained liquid, due to the corrugated nature of the interior surface. This is especially of great importance in extensive drainage systems working under relatively low hydrostatic pressure.

Vitrified clay, especially if glazed internally, offers an ideal means to obviate, or greatly retard, the corrosive and scouring action of the drained fluid.

However, manufacturing limitations do not permit of the burning of clay pipes of sufficient thickness to withstand the considerable earth-pressures prevailing in deeply situated drainage conduits, such as often occur under railroad tracks or roadways built over deep earth-fills.

Many attempts to manufacture vitrified clay pipes of greater thickness than now commonly used have shown that it is almost impossible to obtain a uniform structure throughout the thickness of the pipe, and that severe internal stresses, due to uneven cooling, etc., are established regardless of the amount of care taken during the manufacture. These undetectable internal stresses may cause the pipes to fracture considerably while still in the manufacturing stage, or at any time after their installation, of their own account or due to loading or abrupt temperature changes.

Concrete pipes, although deficient in their ability to permanently resist corrosion or abrasion, possess, nevertheless, the great advantage of being readily manufactured and proportioned to satisfy any requirement as to strength, by accordingly increasing the thickness of the walls and, if necessary, reinforcing same with steel bars or steel-mesh readily obtainable in the trade.

The combination of an outer concrete shell with an inner lining of vitrified clay produces a pipe that meets all the requirements as to resistance to corrosion, abrasion and heavy loads, as well as to low frictional resistance against the flow of liquids.

To the best of my knowledge, the making of such composite pipes, on a basis of mass production and as an article of manufacture has never been undertaken, and this pipe, as an article of manufacture, forms the subject matter of this application.

In this type of conduit, the outside body or shell of concrete, either plain or reinforced, is designed to satisfy all the requirements as to structural strength, whereas the inner lining of vitrified clay, or the like material, is only called upon to supply the necessary resistance to corrosion and abrasion.

This lining, therefore, may be made relatively thin, thereby insuring a uniform hardness and structure throughout its thickness. It is also relatively cheap and does not appreciably increase the weight of the concrete conduit. Being fully embedded in a strong outer shell of concrete, this rather brittle clay-lining is fully protected against injury through handling, and its very smooth vitrified surface offers very little resistance to the flow of liquids conducted therethrough.

The adhesion between the concrete and the outer surface of the lining is such as to preclude the necessity of additional mechanical anchoring means, although such may be readily provided, if found necessary or so specified by the trade.

Reference being had to the drawing, Fig. 1 shows a "tongue and groove" conduit comprising an outer concrete shell 1, reinforced with steel, as at 2, and having at one end the tongue 3 and at the other end the groove 4 which receives the tongue of the next adjacent pipe section. The full tubular lining 5, of vitrified clay, is of one piece and extends the full effective length of the conduit.

In the process of manufacture, this lining may form a part of the inner core of the concrete mold, and the concrete is poured and tamped around it, thus producing a substantially integral unit when the conduit is finished.

Figure 2:
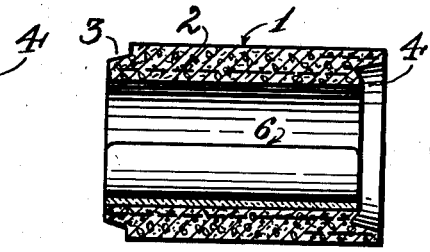
Fig. 2 is a similar view showing the use of an interior lining covering substantially only the lower half of the conduit.
Figure 3:
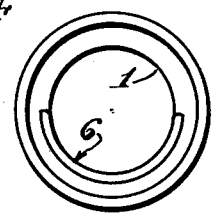
Fig. 3 is an end view of Fig. 2.

The conduit shown in Figs. 2 and 3 differs from the one just described in that the vitrified clay lining 6 covers only the lower portion of the bore of the concrete pipe. Parts similar to those shown in Fig. 1 have been supplied with the same reference numerals. It will be noted that the thickness of the upper half of the concrete shell is increased an amount substantially equal to the thickness of the fractional lining, in order to securely hold same in the conduit.

Figure 4:
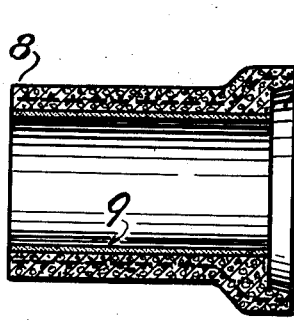

In Fig. 4 there is illustrated a conduit the outer concrete shell of which is formed with the bell-end 7 and the spigot-end 8, and wherein the full tubular clay lining 9 extends from the end of the spigot to the inner face 7ª of the bell.

Figure 5:
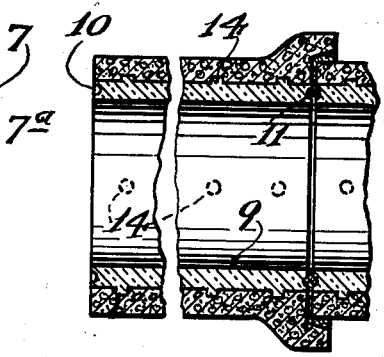
Fig. 5 is a fragmentary longitudinal section showing a modified construction for the inner lining of the conduit.
Figure 6:
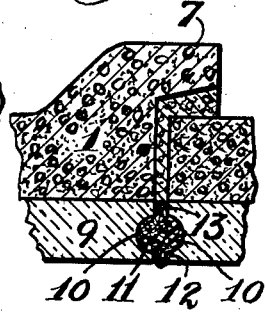
Fig. 6 represents, on a larger scale, the sealing joint shown in Fig. 5.

If desired, and as shown in Fig. 5, both ends of the full clay lining may be provided each with a facial circumferential groove 10 adapted to receive a sealing element 11, preferably made of a yielding and non-hardening bituminous or asphaltic compound. As shown in Fig. 6 in particular, it is advisable to make the sealing element somewhat greater than the combined cross-area of the juxtaposed grooves 10 of two adjacent pipe units, in order to also fill the annular clearance spaces 12 and 13 between said units, as will be readily understood.

It will be noted that this lining is provided with protuberances 14, or other equivalent practical means, located on the outer periphery, to act as mechanical means to additionally secure said lining within the concrete shell.

Figure 7:
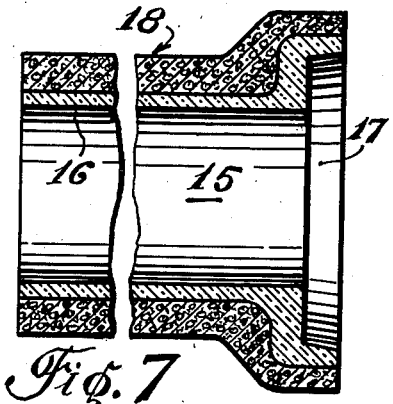
Fig. 7 is a longitudinal sectional view showing another modification of a full inner lining, as applied to a bell and spigot type of conduit.

The conduit shown in Fig. 7 comprises a full tubular lining 15 of the bell and spigot type, comprising the trunk portion 16 and the bell 17; this lining being completely protected against injury by a concrete shell 18 of the required structural strength.

Figure 8:
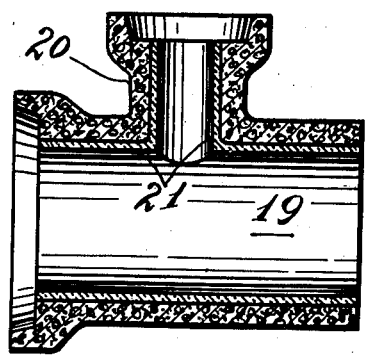
Fig. 8 is a longitudinal sectional view showing my invention as applied to a branch conduit section, also of the bell and spigot type.

The T-shaped conduit unit shown in Fig. 8 is especially intended for use on ramified sewerage or drainage systems. The larger portion 19 of this unit is intended to collect and carry away the liquids brought to it by the feeder lines, each of which terminates in a branch 20, which in this embodiment is assumed to be of the bell-type. The correspondingly shaped lining 21 may be of full tubular form, or it may just cover the lower portion of the conduit, where the greatest wear occurs, as required by the trade or by local conditions.

Figure 9:
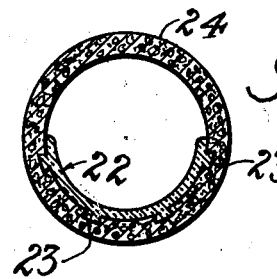
Fig. 9 represents a cross-section showing another method of securing fractional lining elements to the concrete shells of conduits.

In Fig. 9 I have illustrated a different method of securing a fractional lining in a conduit. As shown therein, the lining 22 is provided with longitudinal ribs 23, preferably of dove-tail cross-section, to positively anchor the lining in the concrete shell 24. In this case, the latter may be made of substantially uniform thickness all around, instead of being thickened above the lining, as suggested in Figs. 2 and 3, thus reducing the weight of the conduit.

From the foregoing it will be seen that a conduit built in accordance with this invention satisfies all the requirements as to resistance to corrosion and abrasion, and that such a conduit may be designed and built without difficulty to withstand practically any load encountered in practice. Owing to its adaptability for mass production in conventional concrete pipe manufacturing plants, such conduit may be produced at relatively low cost and its construction supervised at every step of manufacture, to insure superior quality and very close adherence to specified dimensions.

As will be understood, as suggested herein, there may be changes made in the construction and arrangement of the details of this invention without departing from the field and scope of the same, and I intend to include all such variations, as fall within the scope of the appended claims, in this application in which the preferred forms only of my invention have been illustrated and described.

I claim:

1. As an article of manufacture, a unit of composite conduit comprising an outer shell of concrete having male and female ends adapted to coact respectively with the opposite ends of contiguous units; a unitary lining of corrosion and abrasion resisting material embedded within said shell and extending therein from the outer face of the male end to the inner face of the female end, and means positioned in the ends of said lining for the retention of sealing material.

2. As an article of manufacture, a unit of composite conduit comprising an outer shell of concrete having male and female ends adapted to coact respectively with the opposite ends of contiguous units, and a unitary lining of corrosion and abrasion resisting ceramic material embedded in said shell and extending therein from the outer face of the male end to the inner face of the female end, the ends of said lining having grooves to retain therein a sealing medium.

HECTOR ESCHENBRENNER.